(12) United States Patent
He

(10) Patent No.: US 11,481,727 B2
(45) Date of Patent: Oct. 25, 2022

(54) COMMODITY REPLENISHMENT METHOD AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Guoxing He, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/257,678

(22) PCT Filed: Jul. 5, 2019

(86) PCT No.: PCT/CN2019/094792
§ 371 (c)(1),
(2) Date: Jan. 4, 2021

(87) PCT Pub. No.: WO2020/007352
PCT Pub. Date: Jan. 9, 2020

(65) Prior Publication Data
US 2021/0174300 A1 Jun. 10, 2021

(30) Foreign Application Priority Data
Jul. 6, 2018 (CN) .......................... 201810733473.0

(51) Int. Cl.
*G06Q 10/08* (2012.01)
*A47F 5/00* (2006.01)
(Continued)

(52) U.S. Cl.
CPC ....... *G06Q 10/0875* (2013.01); *A47F 5/0081* (2013.01); *B25J 13/089* (2013.01); *G06Q 10/06316* (2013.01)

(58) Field of Classification Search
CPC ......... G06Q 10/0875; G06Q 10/06316; G06Q 10/08; G06Q 30/06; G06Q 10/087; G06Q 30/0601; A47F 5/0081; B25J 13/089
See application file for complete search history.

(56) References Cited

U.S. PATENT DOCUMENTS 8,321,303 B1  11/2012  Krishnamurthy et al.
9,111,251 B1*  8/2015  Brazeau ............... G06Q 10/087
(Continued)

FOREIGN PATENT DOCUMENTS

CN    104616161 A    5/2015
CN    104915875 A    9/2015
(Continued)

OTHER PUBLICATIONS

Y. Chang, W. Ma and Y. Wu, "Principles of storage location assignment in multi-tier shuttle warehouse system," 2017 Chinese Automation Congress (CAC), 2017, pp. 5658-5662. (Year: 2017).*
(Continued)

*Primary Examiner* — Nathan A Mitchell
(74) *Attorney, Agent, or Firm* — Oblon, McClelland, Maier & Neustadt, L.L.P.

(57) ABSTRACT

A commodity replenishment method and device, which relate to the technical field of smart shopping, the method includes determining warehouse-out information and an association relation of shelved commodities according to historical sales information of the commodities; determining placement information of the shelved commodities on shelves based on commodity attributes, the warehouse-out information, the association relationship and shelf informa-
(Continued)

tion; controlling a shelf management system to adjust shelf layout according to the placement information; determining a replenishment quantity and replenishment position of the shelved commodities according to the current remaining quantity of the shelved commodities; controlling a commodity conveying system to place replenished commodities to the replenishment position.

14 Claims, 3 Drawing Sheets

(51) Int. Cl.
   *B25J 13/08* (2006.01)
   *G06Q 10/06* (2012.01)

(56) References Cited

U.S. PATENT DOCUMENTS

| | | | | |
|---|---|---|---|---|
| 11,049,065 | B2* | 6/2021 | Sikka | G06Q 10/087 |
| 2008/0071418 | A1* | 3/2008 | Antony | G06Q 10/087 700/214 |
| 2009/0216364 | A1* | 8/2009 | Grissom | G06Q 10/087 700/214 |
| 2010/0169190 | A1* | 7/2010 | Allison | G06Q 10/087 705/28 |
| 2013/0234852 | A1* | 9/2013 | Sena | G08B 21/182 340/540 |
| 2018/0005173 | A1* | 1/2018 | Elazary | G06Q 10/087 |
| 2018/0060764 | A1* | 3/2018 | Hance | G06Q 50/28 |
| 2018/0068255 | A1* | 3/2018 | Hance | G06Q 10/0838 |
| 2018/0204170 | A1* | 7/2018 | Kao | G06Q 30/0283 |
| 2018/0213160 | A1* | 7/2018 | Tomiyama | B25J 5/007 |
| 2018/0286002 | A1* | 10/2018 | Peck | B65G 1/1371 |
| 2019/0259043 | A1* | 8/2019 | Koneri | G06N 7/005 |
| 2019/0266552 | A1* | 8/2019 | Gupta | B65G 1/1371 |
| 2020/0005226 | A1* | 1/2020 | Sikka | G06Q 10/087 |

FOREIGN PATENT DOCUMENTS

| | | |
|---|---|---|
| CN | 106672521 A | 5/2017 |
| CN | 106709692 A | 5/2017 |
| CN | 107909307 A | 4/2018 |

OTHER PUBLICATIONS

Yingde, Li and Smith, Jeffery S., "Dynamic Slotting Optimization Based on SKUs Correlations in a Zone-based Wave-picking System" (2012). 12th IMHRC Proceedings (Gardanne, France—2012). (Year: 2012).*

M. Kofler, A. Beham, S. Wagner, M. Affenzeller and W. Achleitner, "Re-warehousing vs. healing: Strategies for warehouse storage location assignment," 3rd IEEE International Symposium on Logistics and Industrial Informatics, 2011, pp. 77-82. (Year: 2011).*

Gillman, David. "How Clustering Algorithms Improve Warehouse Efficiency". Retrieved from <https://www.toolbox.com/tech/erp/blogs/how-clustering-algorithms-improve-warehouse-efficiency-062017/>. Jun. 2017. (Year: 2017).*

* cited by examiner

COMMODITY REPLENISHMENT METHOD AND DEVICE

CROSS-REFERENCE TO RELATED APPLICATIONS

The application is based on and claims the benefit of priority to the Chinese patent application No. 201810733473.0 filed on Jul. 6, 2018, which is hereby incorporated by reference in its entirety into the present application.

TECHNICAL FIELD

This disclosure relates to the technical field of intelligent shopping, and in particular, to a commodity replenishment method and device.

BACKGROUND

Currently, a way of selling commodities in traditional shopping places such as supermarkets, shopping malls and the like, is that commodities in a warehouse are manually arranged on shelves for customers to select, when a shelf needs replenishing thereon, a replenishment quantity is manually calculated for the shelf needing replenishing according to foreground sales, replenished commodities are manually transported to the shelf, and the shelf needing replenishing is manually replenished.

SUMMARY

One or more embodiments of the present disclosure provide a commodity replenishment method, comprising: determining warehouse-out information of shelved commodities and an association relation between the shelved commodities according to historical sales information of the commodities; determining placement information of the shelved commodities on shelves based on commodity attributes, the warehouse-out information, the association relation and shelf information of the shelved commodities; controlling a shelf management system to adjust shelf layout according to the placement information, and controlling a commodity conveying system to place the shelved commodities to shelf positions corresponding to the placement information; determining a replenishment quantity and replenishment positions of the shelved commodities according to a current remaining commodity quantity of the shelved commodities; and controlling the commodity conveying system to place replenished commodities corresponding to the replenishment quantity to the replenishment positions.

In some embodiments, that determining the warehouse-out information of the shelved commodities and the association relation between the shelved commodities according to the historical sales information of the commodities comprises: counting a historical sales quantity of the shelved commodities according to historical bills of the commodities; determining an estimated warehouse-out quantity of the shelved commodities based on the historical sales quantity, and determining the warehouse-out information according to the estimated warehouse-out quantity and commodity inventory information; wherein the warehouse-out information comprises: commodity batch number and commodity warehouse-out quantity.

In some embodiments, that determining the association relation between the shelved commodities comprises: counting an appearance frequency of various commodities appearing in same bills according to the historical bills of the commodities; obtaining associated shelved commodities corresponding to the shelved commodities based on the appearance frequency; wherein the appearance frequency of both the shelved commodities and the associated shelved commodities appearing in the same bills is greater than a preset frequency threshold.

In some embodiments, the commodity attributes comprise: commodity type, commodity specification, and commodity sales price; the placement information comprises: shelf type, shelf layer number and specification, and shelf storage location number; that determining the placement information of the shelved commodities on the shelves comprises: determining a proximity relation between placement positions of the shelved commodities and the associated shelved commodities according to a preset associated placement rule and the commodity type; wherein the associated placement rule comprises: an order of the appearance frequency from high to low; determining the shelf type for placing the shelved commodities according to the commodity specification; wherein the shelf type comprises: multi-layer shelf and container shelf; and allocating shelf storage locations for the shelved commodities based on the commodity warehouse-out quantity and the commodity specification.

In some embodiments, that allocating the shelf storage locations for the shelved commodities based on the commodity warehouse-out quantity and the commodity specification, comprises: determining the shelf layer number and specification and the shelf storage location number corresponding to the shelved commodities according to length, height and width information of the shelved commodities and the commodity warehouse-out quantity; or, determining a required shelf container volume according to a unit volume of the shelved commodities and the commodity warehouse-out quantity, and allocating shelf containers to the shelved commodities based on the shelf container volume and determining the shelf storage location number.

In some embodiments, a correspondence relation between the shelf storage location numbers and the shelved commodities is set; and the commodity attribute information of the shelved commodities corresponding to the shelf storage locations is displayed in a display device based on the correspondence relation.

In some embodiments, that determining the replenishment quantity and replenishment positions of the shelved commodities according to the current remaining commodity quantity of the shelved commodities comprises: if it is determined that a ratio of the current remaining commodity quantity of the shelved commodities to the commodity warehouse-out quantity of the shelved commodities is less than or equal to a preset remaining commodity ratio threshold, determining the replenishment quantity of the shelved commodities to perform replenishment processing.

In some embodiments, that determining the replenishment quantity of the shelved commodities comprises: obtaining an estimated replenishment quantity corresponding to the shelved commodities based on a difference between the commodity warehouse-out quantity and the current remaining commodity quantity of the shelved commodities; determining a commodity sales quantity corresponding to the shelved commodities through bill information of the shelved commodities during a period between a commodity outbound and a first replenishment or between two continuous replenishments; obtaining a quantity of picked but not purchased commodities corresponding to the shelved commodities based on a difference between the estimated replenishment quantity and the commodity sales quantity; and determining the replenishment quantity based on the commodity sales quantity and the quantity of the picked but not purchased commodities.

In some embodiments, that determining the replenishment quantity based on the commodity sales quantity and the quantity of the picked but not purchased commodities comprises: determining that the replenishment quantity C=A*the commodity sales quantity+B*the picked but not purchased quantity, where A and B are weighting coefficients set corresponding to the commodity types, and C is less than or equal to the estimated replenishment quantity.

In some embodiments, that determining the replenishment positions of the shelved commodities comprises: acquiring detection signals acquired by detection devices disposed corresponding to the shelf storage locations; determining a containable quantity of the replenished commodities corresponding to the shelf storage locations based on the detection signals; and determining the quantity of the replenished commodities corresponding to the shelf storage locations according to a preset replenishment arrangement rule and the containable quantity of the replenished commodities, wherein the replenishment arrangement rule comprises: allocating the replenished commodities according to a proportion relation of the containable quantity of the replenished commodities.

In some embodiments, the detection device comprises: a weight sensor and a ranging sensor; and the detection signal comprises: a weight signal and a distance between the shelved commodities in the shelf storage location and an edge of the shelf storage location.

One or more embodiments of the present disclosure provide a commodity replenishment device comprising: a processor; and a memory coupled to the processor, storing program instructions which, when executed by the processor, cause the processor to: determine warehouse-out information of shelved commodities and an association relation between the shelved commodities according to historical sales information of the commodities; determine placement information of the shelved commodities on shelves based on commodity attributes, the warehouse-out information, the association relation and shelf information of the shelved commodities; control a shelf management system to adjust shelf layout according to the placement information, and controlling a commodity conveying system to place the shelved commodities to shelf positions corresponding to the placement information; determine a replenishment quantity and replenishment positions of the shelved commodities according to a current remaining commodity quantity of the shelved commodities; and control the commodity conveying system to place replenished commodities corresponding to the replenishment quantity to the replenishment positions.

In some embodiments, the determining the warehouse-out information of the shelved commodities and the association relation between the shelved commodities according to the historical sales information of the commodities comprises: counting a historical sales quantity of the shelved commodities according to historical bills of the commodities; determining an estimated warehouse-out quantity of the shelved commodities based on the historical sales quantity, and determining the warehouse-out information according to the estimated warehouse-out quantity and commodity inventory information; wherein the warehouse-out information comprises: commodity batch number and commodity warehouse-out quantity.

In some embodiments, the determining the association relation between the shelved commodities comprises: counting an appearance frequency of various commodities appearing in same bills according to the historical bills of the commodities; obtaining associated shelved commodities corresponding to the shelved commodities based on the appearance frequency; wherein the appearance frequency of both the shelved commodities and the associated shelved commodities appearing in the same bills is greater than a preset frequency threshold.

In some embodiments, the commodity attributes comprise: commodity type, commodity specification, and commodity sales price; the placement information comprises: shelf type, shelf layer number and specification, and shelf storage location number; and that determining the placement information of the shelved commodities on the shelves comprises: determining a proximity relation between placement positions of the shelved commodities and the associated shelved commodities according to a preset associated placement rule and the commodity type; wherein the associated placement rule comprises: an order of the appearance frequency from high to low; determining a shelf type for placing the shelved commodities according to the commodity specification; wherein the shelf type comprises: multi-layer shelf and container shelf; and allocating shelf storage locations for the shelved commodities based on the commodity warehouse-out quantity and the commodity specification.

In some embodiments, the allocating the shelf storage locations for the shelved commodities based on the commodity warehouse-out quantity and the commodity specification, comprises: determining the shelf layer number and specification and the shelf storage location numbers corresponding to the shelved commodities according to length, height and width information of the shelved commodities and the commodity warehouse-out quantity; or, determining a required shelf container volume according to a unit volume of the shelved commodities and the commodity warehouse-out quantity, and allocating shelf containers to the shelved commodities based on the shelf container volume and determining shelf storage location numbers.

In some embodiments, the memory further stores program instructions which, when executed by the processor, cause the processor to: set a correspondence relation between the shelf storage location numbers and the shelved commodities; and display the commodity attribute information of the shelved commodities corresponding to the shelf storage locations in a display device based on the correspondence relation.

In some embodiments, the determining the replenishment quantity and the replenishment positions of the shelved commodities according to the current remaining commodity quantity of the shelved commodities comprises: if it is determined that a ratio of the current remaining commodity quantity of the shelved commodities to the commodity warehouse-out quantity of the shelved commodities is less than or equal to a preset remaining commodity ratio threshold, determining the replenishment quantity of the shelved commodities to perform replenishment processing.

In some embodiments, the determining the replenishment quantity of the shelved commodities comprises: obtaining an estimated replenishment quantity corresponding to the shelved commodities based on a difference between the commodity warehouse-out quantity and the current remaining commodity quantity of the shelved commodities; determining a commodity sales quantity corresponding to the shelved commodities through bill information of the shelved commodities during a period between a commodity outbound and a first replenishment or between two continuous replenishments; obtaining a quantity of picked but not purchased commodities corresponding to the shelved commodities based on a difference between the estimated replenishment quantity and the commodity sales quantity; and determining the replenishment quantity based on the commodity sales quantity and the quantity of the picked but not purchased commodities.

One or more embodiments of the present disclosure provide a non-transitory computer-readable storage medium having stored thereon computer program instructions which, when executed by one or more processors, cause the one or more processors to: determine warehouse-out information of shelved commodities and an association relation between the shelved commodities according to historical sales information of the commodities; determine placement information of the shelved commodities on shelves based on commodity attributes, the warehouse-out information, the association relation and shelf information of the shelved commodities; control a shelf management system to adjust shelf layout according to the placement information, and controlling a commodity conveying system to place the shelved commodities to shelf positions corresponding to the placement information; determine a replenishment quantity and replenishment positions of the shelved commodities according to a current remaining commodity quantity of the shelved commodities; and control the commodity conveying system to place replenished commodities corresponding to the replenishment quantity to the replenishment positions.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments of the present disclosure or technical solutions in the related arts, the drawings required to be used in the description of the embodiments or related arts will be briefly introduced below. It is obvious that the drawings described below are only some of the embodiments of the present disclosure, and for those of ordinary skill in the art, other drawings can also be obtained according to these drawings without paying out creative efforts.

DETAILED DESCRIPTION

The technical solutions in the embodiments of the present disclosure will be described clearly and completely with reference to the accompanying drawings in the embodiments of the present disclosure. Obviously, the described embodiments are only a few embodiments of the present disclosure, and not all embodiments. All other embodiments, which can be derived by those of ordinary skill in the art from the embodiments of the present disclosure herein without making any creative effort, shall fall within the protection scope of the present disclosure.

Technical solutions in the related arts have defects that: when shelves need replenishing, since a replenishment quantity is calculated manually and commodities are replenished manually, high labor cost is required, commodity loading efficiency is influenced by human factors, a shortage quantity of the commodities placed on shelves cannot be dynamically calculated according to shelf sizes, and the commodities placed on the shelves cannot be dynamically adjusted.

Figure 1:
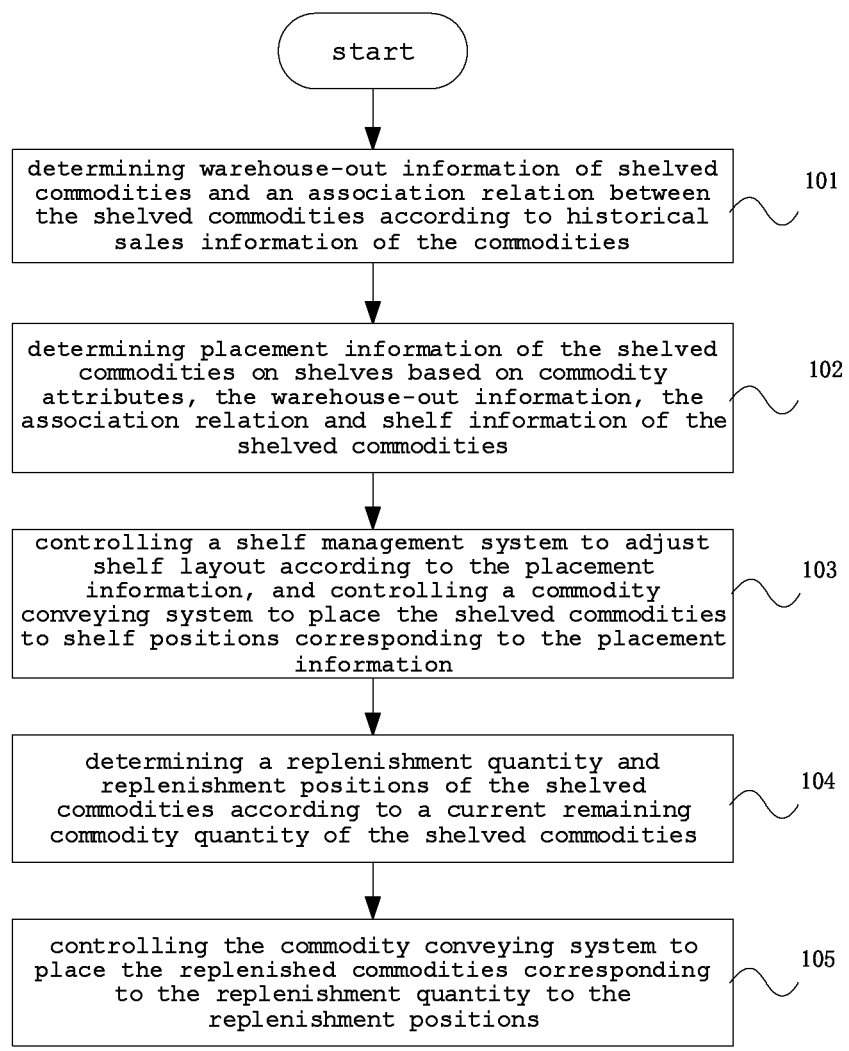
FIG. 1 is a schematic flowchart of a commodity replenishment method according to some embodiments of the present disclosure.
Figure 2:
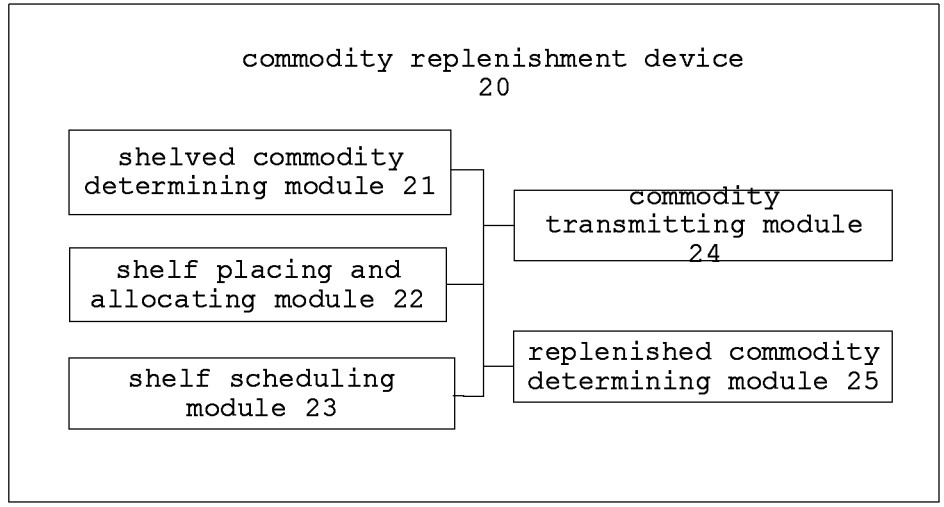
FIG. 2 is a schematic block diagram of a commodity replenishment device according to some embodiments of the present disclosure.

FIG. 1 is a schematic flowchart of a commodity replenishment method according to some embodiments of the present disclosure, and as shown in FIG. 1, the commodity replenishment method comprises steps 101 to 105.

Step 101, determining warehouse-out information of shelved commodities and an association relation between the shelved commodities according to historical sales information of the commodities. A sales system records the historical sales information of the commodities, comprising the sales information such as a sales quantity of the commodities, specific batch numbers of the sold commodities. The warehouse-out information comprises commodity batch numbers and a commodity warehouse-out quantity of the shelved commodities, etc. The commodity warehouse-out quantity can be number, volume, weight etc. of the commodities.

Step 102, determining placement information of the shelved commodities on shelves based on commodity attributes, the warehouse-out information, the association relation and shelf information of the shelved commodities. The placement information comprises shelf type, shelf layer number and specification, shelf storage location number, and the like; the shelf specification is data such as length, width, height of every shelf layer, a plurality of shelf storage locations can be set on each shelf layer, the shelf storage locations may be lattices etc. for placing commodities, and the shelf storage location number is the number of the shelf storage location.

Step 103, controlling a shelf management system to adjust shelf layout according to the placement information, and controlling a commodity conveying system to place the shelved commodities to shelf positions corresponding to the placement information.

The shelf management system can adjust the length, width, height, and the like of the shelf by a shelf adjusting device, and the shelf adjusting device can be various existing devices. For example, the shelf adjusting device comprises connecting rods, a hydraulic device, and the like. A shelf partition board can slide in a transverse or longitudinal slideway and is connected with the hydraulic device through the connecting rods.

The shelf adjusting device controls the hydraulic device to contract or extend according to the received placement information, for driving the partition board to slide in the transverse or longitudinal slideway to a specified position, so as to realize the adjustment of the shelf layout.

The commodity conveying system may be various existing conveying systems. For example, the commodity conveying system comprises a handling device (e.g., a robot), conveyor belt, manipulator, and the like, by which the commodity conveying system can place the shelved commodities to the shelf positions corresponding to the placement information, and the commodity conveying system can also use the handling device to perform operations such as replenishing, unloading and returning to the warehouse for the shelved commodities.

Step 104, determining a replenishment quantity and replenishment positions of these shelved commodities according to a current remaining commodity quantity of the shelved commodities. The replenishment quantity can be number, volume, weight, etc. of the replenished commodities, and the replenishment positions can be the shelf storage positions on the shelves and the like.

Step 105, controlling the commodity conveying system to place the replenished commodities corresponding to the replenishment quantity to the replenishment positions.

In some embodiments, a historical sales quantity of the shelved commodities is counted according to historical bills of the commodities, and it may be the historical sales quantity in a preset time period before the current time, for example, the historical sales quantity within a month before the current time. An estimated warehouse-out quantity of the shelved commodity is determined based on the historical sales quantity, and generally, the estimated warehouse-out quantity of the shelved commodity having a larger historical sales quantity is greater.

The warehouse-out information is determined according to the estimated warehouse-out quantity and commodity inventory information, and can comprise commodity batch number, commodity warehouse-out quantity, and the like. For example, if a quantity of the shelved commodities in a batch of an inventory is greater than the estimated warehouse-out quantity, the shelved commodities are selected from this batch, and if the quantity of the shelved commodities in a batch of the inventory is less than the estimated warehouse-out quantity, the shelved commodities are selected from a plurality of batches.

An appearance frequency of various commodities appearing in same bills is counted according to the historical bills of the commodities. For example, a ratio of a quantity of bills including both commodities A and B in a bill set to a total quantity of bills in the bill set is calculated, which is the appearance frequency of the commodities A and B in the same bills, for showing an association relation between the commodities A and B.

Associated shelved commodities corresponding to the shelved commodities are obtained based on the appearance frequency, and the appearance frequency of both the shelved commodities and the associated shelved commodities appearing in the same bills is greater than a preset frequency threshold. For example, if an appearance frequency of the commodities A and B in the same bills is obtained to be 0.05, and a preset frequency threshold is 0.03, then the commodities A and B are associated shelved commodities with each other.

In some embodiments, commodity attributes can be stored in a commodity system, and comprise: commodity type, commodity batch number, commodity specification (attributes such as length, width, height and weight), commodity sales price, code and the like. An proximity relation between the placement positions of the shelved commodities and the associated shelved commodities is determined according to a preset associated placement rule and the commodity type, wherein the associated placement rule can comprise an order of the appearance frequency from high to low, etc.

For example, E, F, G are determined to be associated shelved commodities of shelved commodities D, and since commodity types of the shelved commodities D and the associated shelved commodities G are respectively aquatic products and clothes, the shelved commodities D and the associated shelved commodities G cannot be placed adjacently. Appearance frequencies of the shelved commodities D and the associated shelved commodities E, F are respectively 0.05 and 0.03, and the shelf position for placing the associated shelved commodities E is closer to the shelved commodities D than that for placing the associated shelved commodities F.

A shelf type for placing the shelved commodities is determined according to the commodity specification, wherein the shelf type comprises: multilayer shelf and container shelf, and the like. For example, a shelf type for shelved commodities having a fixed shape package is a multilayer shelf. The shelf storage locations are allocated for the shelved commodities based on the commodity warehouse-out quantity and the commodity specification. The way of allocation can be various. The shelf layer number and specification and the shelf storage location numbers corresponding to these shelved commodities can be determined according to the length, height and width information of the shelved commodities and the commodity warehouse-out quantity.

For example, for the shelved commodities having a fixed package shape, a shelf layer height, column location (shelf storage location) size of each shelf layer, etc. are dynamically calculated according to the length, height, and width information of the shelved commodities and the commodity warehouse-out quantity. Length L, width W and height H of the shelf are acquired according to selected shelf positions. The commodity warehouse-out quantity (N), the length ($S\_L\_i$), width ($S\_W\_i$) and height ($S\_H\_i$) of the shelved commodities are acquired, where S represents commodities, and i represents a certain commodity. A quantity of the commodities that can be placed in each shelf storage location is calculated according to the commodity width, that is, the shelf width W/the commodity width $S\_W\_i$=the quantity of the commodities that can be placed in the shelf storage location. A commodity arrangement length (SUM_L) is counted according to the quantity of the commodities that can be placed in the shelf storage location and a commodity outbound quantity, and a shelf layering K is acquired by rounding down SUM_L/L (the shelf length), and each shelf layer height needs to meet a maximum height MAX of the shelved commodities. An adjusting instruction is issued to a shelf adjusting device according to the determined shelf layout, so as to cause the shelf adjusting device to adjust the shelf.

A Required shelf container volume can be determined according to an unit volume of the shelved commodities and the commodity warehouse-out quantity, shelf containers are allocated for the shelved commodities based on the shelf container volume, and shelf storage location numbers are determined. For example, for weighing shelves (e.g., containers loaded with rice in a supermarket), a required shelf container volume is determined according to a unit volume of the shelved commodities multiplied by a commodity warehouse-out volume, the required shelf container volume is divided by a unit volume of shelf containers to obtain a required shelf container quantity, and shelf storage location numbers of the shelf containers are determined. And an adjusting instruction can be issued to the shelf adjusting device according to the required shelf container volume, so that the shelf adjusting device adjusts the partition boards in the shelf container to make the shelf container volume meet the required shelf container volume.

A correspondence relation between the shelf storage location numbers and the shelved commodities is set, and the commodity attribute information of the shelved commodities corresponding to the shelf storage locations is displayed in a display device based on the correspondence relation. For example, according to the shelved commodities at each shelf storage location on the shelf, related labels such as a name and price of the shelved commodities are displayed on an electronic label display screen.

In some embodiments, if it is determined that a ratio of the current remaining commodity quantity of the shelved commodities to the commodity warehouse-out quantity of the shelved commodities is less than or equal to a preset remaining commodity ratio threshold, the replenishment quantity of the shelved commodities is determined to perform replenishment processing.

For example, detecting devices such as weight sensors or ranging sensors can be disposed at each shelf storage location where the shelved commodities A are placed, and a total weight of the current remaining commodities is obtained by adding a weight measured by each weight sensor. If the weight of each shelved commodity A is consistent, the total weight of the current remaining commodities is divided by the weight of each shelved commodity A to obtain the current remaining commodity quantity. If the shelved commodity A is a weighing commodity, the total weight of the current remaining commodity is considered as the current remaining commodity quantity. A remaining commodity ratio threshold can be set to be 0.5, and when a current ratio of the current remaining commodity quantity of the shelved commodity to the commodity warehouse-out quantity of this shelved commodity is less than 0.5, the replenishment quantity of the shelved commodity is determined to perform replenishment processing.

There may be various ways to determine the replenishment quantity of the shelved commodities. For example, an estimated replenishment quantity corresponding to the shelved commodities is obtained based on a difference between the commodity warehouse-out quantity and the current remaining commodity quantity of the shelved commodities, and a commodity sales quantity corresponding to the shelved commodities is determined through bill information of the shelved commodities during a period between a commodity outbound and a first replenishment or between two continuous replenishments. Based on a difference between the estimated replenishment quantity and the commodity sales quantity, a quantity of picked but not purchased commodities corresponding to the shelved commodities is obtained, and based on the commodity sales quantity and the quantity of the picked but not purchased commodities, the replenishment quantity is determined.

There may be various ways to determine the replenishment quantity based on the commodity sales quantity and the quantity of the picked but not purchased commodities. For example, it is determined that the replenishment quantity $C=A*$the commodity sales quantity$+B*$the picked but not purchased quantity, where C is less than or equal to the estimated replenishment quantity. A and B are weighting coefficients set corresponding to the commodity type, for example, when the commodity type is food, A is 1, B is 0.9, and when the commodity type is clothes, A is 0.9, B is 0.4.

In some embodiments, there may be various ways to determine the replenishment positions of the shelved commodities. For example, detection signals acquired by detection devices disposed corresponding to the shelf storage locations are acquired, the detection devices used comprise weight sensors, ranging sensors, and the like, and the detection signal comprises a weight signal, a distance between the shelved commodities in the shelf storage location and an edge of this shelf storage location, and the like. A containable quantity of the replenished commodities corresponding to the shelf storage locations is determined based on the detection signals.

For example, if the weight of each shelved commodity A is consistent, a weight measured by a weight sensor disposed at a shelf storage location for placing the shelved commodities A is acquired, the weight is divided by the weight of each shelved commodity A to obtain a quantity of remaining shelved commodities A, and the quantity of the remaining shelved commodities A is subtracted from a containable quantity of the shelved commodities A at this shelf storage location to obtain the containable quantity of replenished commodities corresponding to this shelf storage location.

Or, if a thickness of each shelved commodity A is consistent, a distance, measured by a ranging sensor disposed at a shelf storage location for placing the shelved commodities A, between the shelved commodities A at this shelf storage location and an edge of this shelf storage location, is acquired, and this distance is divided by the thickness of each shelved commodity A to obtain the containable quantity of the replenished commodities corresponding to this shelf storage location.

The quantity of the replenished commodities corresponding to the shelf storage locations is determined according to a preset replenishment arrangement rule and the containable quantity of the replenished commodities. The replenishment arrangement rule can be various, comprising allocating the replenished commodities according to a proportion relation of the containable quantity of the replenished commodities, etc. For example, a quantity of replenished commodities corresponding to a shelf storage location A is 4, a quantity of replenished commodities corresponding to a shelf storage location B is 6, and a ratio of the quantity of the replenished commodities corresponding to the shelf storage location A to the quantity of the replenished commodities corresponding to the shelf storage location B is 2:3. If there are 5 replenished commodities, 2 replenished commodities are allocated to the shelf storage location A, and 3 replenished commodities are allocated to the shelf storage location B.

In some embodiments, an instruction about the replenishment quantity is issued according to the inventory and current sales, and if it is an empty shelf or automatic commodity arrangement is reset, the warehouse-out information and the placement information can be obtained by recalculation. If it is an automatic replenishment instruction, the replenishment of the commodities or commodity batches that are required to be automatically completed by the shelf is calculated according to the commodity inventory, the sales and the like.

An replenishment instruction can be issued to a commodity conveying system, after commodities or commodities in a batch are positioned in a warehouse, the commodities or commodities in the batch needing replenishing are passed onto a conveyor belt by a robotic arm, each kind of commodities can be placed into a replenishment cell on the conveyor belt, and the commodities are, by the conveyor belt, conveyed to a specified shelf cell (for example, a Nth cell of a Mth layer), namely a shelf storage location; meanwhile, the commodities are directly pushed into the cell (the shelf storage location) by a pushing handle or a manipulator and the like. If a commodity returning instruction is issued to the commodity conveying system, the whole shelf cell is, by the commodity conveying system, pushed back to the warehouse through the conveyor belt, and placed back to the original commodity storage location in the warehouse through the robotic arm.

In some embodiments, the present disclosure provides a commodity replenishment device 20 comprising: a shelved commodity determining module 21, a shelf placing and allocating module 22, a shelf scheduling module 23, a commodity transmitting module 24, and a replenished commodity determining module 25. The shelved commodity determining module 21 determines warehouse-out information of shelved commodities and an association relation between the shelved commodities according to historical sales information of the commodities. The shelf placing and allocating module 22 determines placement information of the shelved commodities on shelves based on commodity attributes, the warehouse-out information, the association relation, and shelf information of the shelved commodities.

The shelf scheduling module 23 controls a shelf management system to adjust shelf layout according to the placement information. The commodity transmitting module 24 controls a commodity conveying system to place the shelved commodities to shelf positions corresponding to the placement information. The replenished commodity determining module 25 determines a replenishment quantity and replenishment positions of the shelved commodities according to a current remaining commodity quantity of the shelved commodities. The commodity transmitting module 24 controls the commodity conveying system to place the replenished commodities corresponding to the replenishment quantity to the replenishment positions.

In some embodiments, the shelved commodity determining module 21 counts a historical sales quantity of the shelved commodities according to historical bills of the commodities, determines an estimated warehouse-out quantity of the shelved commodities based on the historical sales quantity, and the shelved commodity determining module 21 determines warehouse-out information according to the estimated warehouse-out quantity and commodity inventory information, wherein the warehouse-out information comprises commodity batch number, commodity warehouse-out quantity, and the like. The shelved commodity determining module 21 counts an appearance frequency of various commodities appearing in same bills according to the historical bills of the commodities, and obtains associated shelved commodities corresponding to the shelved commodities based on the appearance frequency, wherein the appearance frequency of both the shelved commodities and the associated shelved commodities appearing in the same bills is greater than a preset frequency threshold.

The commodity attributes comprise commodity type, commodity specification, commodity sales price, and the like. The placement information comprises shelf type, shelf layer number and specification, shelf storage location number and the like. The shelf allocating module 22 determines a proximity relation between placement positions of the shelved commodities and the associated shelved commodities according to a preset associated placement rule and the commodity type, and the associated placement rule comprises an order of the appearance frequency from high to low, etc. The shelf placing and allocating module 22 determines a shelf type for placing the shelved commodities according to the commodity specification, and the shelf type comprises multilayer shelf, container shelf, and the like. The shelf placing and allocating module 22 allocates shelf storage locations for the shelved commodities based on the commodity warehouse-out quantity and the commodity specification.

The shelf placing and allocating module 22 determines the shelf layer number and specification and the shelf storage location numbers corresponding to the shelved commodities according to length, height and width information of the shelved commodities and the commodity warehouse-out quantity; or, the shelf placing and allocating module 22 determines a required shelf container volume according to a unit volume of the shelved commodities and the commodity warehouse-out quantity, allocates shelf containers to the shelved commodities based on the shelf container volume and determines the shelf storage location numbers. The shelf scheduling module 23 sets a correspondence relation between the shelf storage location numbers and the shelved commodities. The shelf scheduling module 23 displays the commodity attribute information of the shelved commodities corresponding to the shelf storage locations on a display device based on the correspondence relation.

Figure 3:
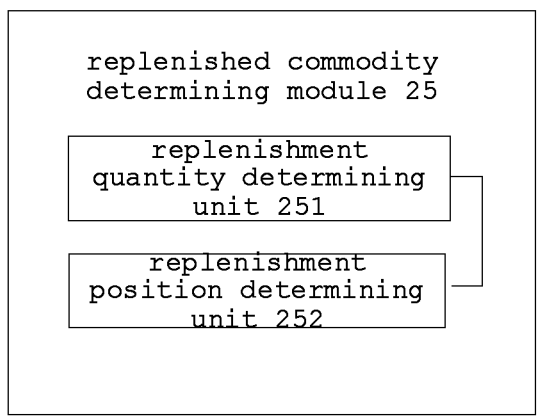
FIG. 3 is a schematic block diagram of a replenished commodity determining module of the commodity replenishment device according to some embodiments of the present disclosure.

In some embodiments, as shown in FIG. 3, the replenished commodity determining module 25 comprises: a replenishment quantity determining unit 251 and a replenishment position determining unit 252. If the replenishment quantity determining unit 251 determines that a ratio of the current remaining commodity quantity of the shelved commodities to the commodity warehouse-out quantity of the shelved commodities is less than or equal to a preset remaining commodity ratio threshold, the replenishment quantity of the shelved commodities is determined to perform replenishment processing.

The replenishment quantity determining unit 251 obtains an estimated replenishment quantity corresponding to the shelved commodities based on a difference between the commodity warehouse-out quantity and the current remaining commodity quantity of the shelved commodities. The replenishment quantity determining unit 251 determines the commodity sales quantity corresponding to the shelved commodities through billing information of the shelved commodities during a period between a commodity outbound and a first replenishment or between two continuous replenishments. The replenishment quantity determining unit 251 obtains a quantity of picked but not purchased commodities corresponding to the shelved commodities based on a difference between the estimated replenishment quantity and the commodity sales quantity. The replenishment quantity determining unit 251 determines the replenishment quantity based on the commodity sales quantity and the quantity of the picked but not purchased commodities.

The replenishment quantity determining unit 252 determines that the replenishment quantity $C = A*$the commodity sales quantity $+ B*$the picked but not purchased quantity, where $A$ and $B$ are weighting coefficients set corresponding to the commodity types, and $C$ is less than or equal to the estimated replenishment quantity.

The replenishment position determining unit 252 acquires detection signals acquired by detecting devices disposed corresponding to the shelf storage locations. The replenishment position determining unit 252 determines a containable quantity of the replenished commodities corresponding to the shelf storage locations based on the detection signals, and determines the quantity of the replenished commodities corresponding to the shelf storage locations according to a preset replenishment arrangement rule and the containable quantity of the replenishment commodities, wherein the replenishment arrangement rule comprises: allocating the replenishment commodities according to a proportion relation of the containable quantity of the replenishment commodities, etc. The detecting devices comprise: weight sensors, ranging sensors, etc.; the detection signal comprises: a weight signal and a distance between the shelved commodities at the shelf storage location and an edge of this shelf storage location.

Figure 4:
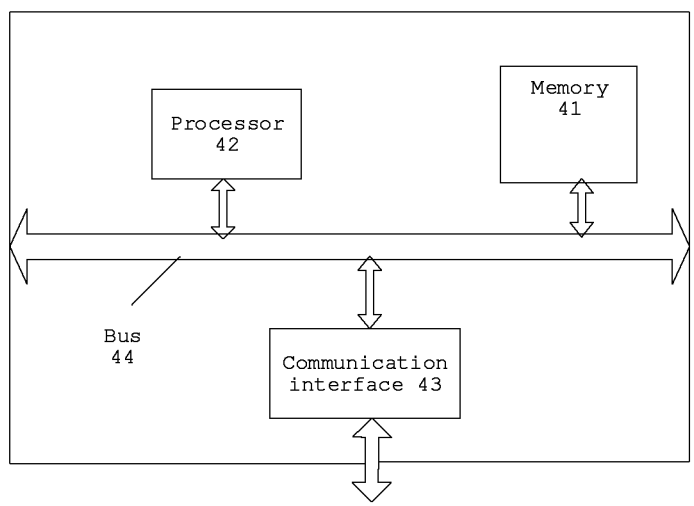
FIG. 4 is a schematic block diagram of a commodity replenishment device according to some other embodiments of the present disclosure.

FIG. 4 is a schematic block diagram of a commodity replenishment device according to another embodiment of the present disclosure. As shown in FIG. 4, the device may comprise a memory 41, a processor 42, a communication interface 43, and a bus 44. The memory 41 is used for storing instructions, the processor 42 is coupled to the memory 41, and the processor 42 is configured to implement the commodity replenishment method described above based on the execution of the instructions stored in the memory 41.

The memory 41 can be a high-speed RAM memory, a non-volatile memory, or the like, and also be a memory array. The storage 41 may still be partitioned into blocks, and the blocks can be combined into virtual volumes according to a certain rule. The processor 42 can be a central processing unit CPU, or an ASIC (Application Specific Integrated Circuit), or one or more integrated circuits configured to implement the commodity replenishment method according to the present disclosure.

In some embodiments, the present disclosure further provides a computer-readable storage medium, wherein the computer-readable storage medium stores computer instructions, which when executed by a processor, implement the commodity replenishment method according to any of the above embodiments. It should be appreciated by those skilled in the art that the embodiments of the present disclosure may be provided as a method, device, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program code therein.

The present disclosure is described with reference to flowcharts and/or block diagrams of methods, devices (systems) and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that by the instructions which are executed by the processor of the computer or other programmable data processing apparatus, a means for implementing the functions specified in one or more flows of the flowcharts and/or one or more blocks of the block diagrams is created.

The commodity replenishment method and device in the embodiments described above can realize full-flow automatic operations of commodities on shelves, such as commodity loading and unloading, automatic determination of commodity placement positions, full-automatic commodity replenishment, which improves commodity loading and replenishing efficiency, reduces staff in shopping places, lowers operation cost of supermarkets, raises customer experience and increases sales amount of the supermarkets.

The method and system according to the present disclosure may be implemented in many ways. For example, the method and system according to the present disclosure may be implemented in software, hardware, firmware, or any combination of software, hardware, and firmware. The above-described order for the steps of the method is for illustration only, and the steps of the method according to the present disclosure are not limited to the order specifically described above unless specifically stated otherwise. Further, in some embodiments, the present disclosure may also be embodied as programs recorded in a recording medium, and these programs comprises machine-readable instructions for implementing the methods according to the present disclosure. Thus, the present disclosure also covers a recording medium storing the programs for executing the methods according to the present disclosure.

The description of the present disclosure has been presented for purposes of illustration and description, and is not intended to be exhaustive or limited to the present disclosure in the form disclosed. Many modifications and variations will be apparent to those of ordinary skill in the art. The embodiments were chosen and described in order to best illustrate the principles and practical applications of the present disclosure, and to enable those of ordinary skill in the art to understand the present disclosure, thereby designing various embodiments with various modifications suitable for a particular use.

What is claimed is:

1. A commodity replenishment method, comprising:
   querying historical sales information of commodities recorded in a sales system, and determining warehouse-out information of shelved commodities and an association relation between the shelved commodities according to the historical sales information of the commodities, wherein
   the determining the warehouse-out information of the shelved commodities and the association relation between the shelved commodities according to the historical sales information of the commodities comprises:
      counting a historical sales quantity of the shelved commodities according to historical bills of the commodities,
      determining an estimated warehouse-out quantity of the shelved commodities based on the historical sales quantity,
      determining the warehouse-out information according to the estimated warehouse-out quantity and commodity inventory information,
      counting an appearance frequency of various commodities appearing in same bills according to the historical bills of the commodities, and
      obtaining associated shelved commodities corresponding to the shelved commodities based on the appearance frequency,
   the warehouse-out information comprises: a commodity batch number and a commodity warehouse-out quantity, and
   the appearance frequency of both the shelved commodities and the associated shelved commodities appearing in the same bills is greater than a preset frequency threshold;
   querying commodity attributes stored in a commodity system, and determining placement information of the shelved commodities on shelves based on the commodity attributes, the warehouse-out information, the association relation, and shelf information of the shelved commodities, wherein
      the commodity attributes comprise commodity type, commodity specification, and commodity sales price, the placement information comprises shelf type, shelf layer number and specification, and shelf storage location number, and the determining the placement information of the shelved commodities on the shelves comprises:
    determining a proximity relation between placement positions of the shelved commodities and the associated shelved commodities according to a preset associated placement rule and the commodity type, the preset associated placement rule including an order of the appearance frequency from high to low,
    determining a shelf type for placing the shelved commodities according to the commodity specification, the shelf type including a multilayer shelf and a container shelf, and
    allocating shelf storage locations for the shelved commodities based on the commodity warehouse-out quantity and the commodity specification;

issuing an adjusting instruction to a shelf adjusting device according to a determined shelf layout, so as to control the shelf adjusting device to adjust a shelf layout according to the placement information, and controlling a commodity conveying system to place the shelved commodities to shelf positions corresponding to the placement information;

determining a current remaining commodity quantity of the shelved commodities based on detection signals collected by detection devices disposed correspondingly to the shelf storage locations, and determining a replenishment quantity and replenishment positions of the shelved commodities according to the current remaining commodity quantity of the shelved commodities; and issuing an replenishment instruction to the commodity conveying system, so as to control the commodity conveying system to place replenished commodities corresponding to the replenishment quantity to the replenishment positions.

2. The commodity replenishment method according to claim 1, wherein the allocating the shelf storage locations for the shelved commodities based on the commodity warehouse-out quantity and the commodity specification comprises:
    determining the shelf layer number and specification and the shelf storage location numbers corresponding to the shelved commodities according to length, height, and width information of the shelved commodities and the commodity warehouse-out quantity; or
    determining a required shelf container volume according to a unit volume of the shelved commodities and the commodity warehouse-out quantity, and allocating shelf containers to the shelved commodities based on the shelf container volume and determining shelf storage location numbers.

3. The commodity replenishment method according to claim 2, further comprising:
    setting a correspondence relation between the shelf storage location numbers and the shelved commodities; and
    displaying commodity attribute information of the shelved commodities corresponding to the shelf storage locations in a display device based on the correspondence relation.

4. The commodity replenishment method according to claim 2, wherein the determining the replenishment quantity and the replenishment positions of the shelved commodities according to the current remaining commodity quantity of the shelved commodities comprises:
    if it is determined that a ratio of the current remaining commodity quantity of the shelved commodities to the commodity warehouse-out quantity of the shelved commodities is less than or equal to a preset remaining commodity ratio threshold, determining the replenishment quantity of the shelved commodities to perform replenishment processing.

5. The commodity replenishment method according to claim 4, wherein the determining the replenishment quantity of the shelved commodities comprises:
    obtaining an estimated replenishment quantity corresponding to the shelved commodities based on a difference between the commodity warehouse-out quantity and the current remaining commodity quantity of the shelved commodities;
    determining a commodity sales quantity corresponding to the shelved commodities through bill information of the shelved commodities during a period between a commodity outbound and a first replenishment or between two continuous replenishments;
    obtaining a quantity of picked but not purchased commodities corresponding to the shelved commodities based on a difference between the estimated replenishment quantity and the commodity sales quantity; and
    determining the replenishment quantity based on the commodity sales quantity and the quantity of the picked but not purchased commodities.

6. The commodity replenishment method according to claim 4, wherein the determining the replenishment quantity based on the commodity sales quantity and the quantity of the picked but not purchased commodities comprises:
    determining that the replenishment quantity $C = A \times D + B \times E$,
    wherein A and B are weighting coefficients set corresponding to the commodity types, D is the commodity sales quantity, and E is the picked but not purchased quantity.

7. The commodity replenishment method according to claim 2, wherein the determining the replenishment positions of the shelved commodities comprises:
    acquiring the detection signals collected by the detection devices disposed correspondingly to the shelf storage locations;
    determining a containable quantity of the replenished commodities corresponding to the shelf storage locations based on the detection signals; and
    determining the quantity of the replenished commodities corresponding to the shelf storage locations according to a preset replenishment arrangement rule and the containable quantity of the replenished commodities, the replenishment arrangement rule including allocating the replenished commodities according to a proportion relation of the containable quantity of the replenished commodities.

8. The commodity replenishment method according to claim 7, wherein,
    the detection devices include: a weight sensor and a ranging sensor; and
    the detection signals include: a weight signal and a distance between the shelved commodities in the shelf storage location and an edge of the shelf storage location.

9. A commodity replenishment device comprising:
    a processor; and a memory coupled to the processor, storing program instructions which, when executed by the processor, cause the processor to:

query historical sales information of commodities recorded in a sales system, and determine warehouse-out information of shelved commodities and an association relation between the shelved commodities according to the historical sales information of the commodities, wherein the determining the warehouse-out information of the shelved commodities and the association relation between the shelved commodities according to the historical sales information of the commodities comprises:

counting a historical sales quantity of the shelved commodities according to historical bills of the commodities, determining an estimated warehouse-out quantity of the shelved commodities based on the historical sales quantity, determining the warehouse-out information according to the estimated warehouse-out quantity and commodity inventory information, counting an appearance frequency of various commodities appearing in same bills according to the historical bills of the commodities, and obtaining associated shelved commodities corresponding to the shelved commodities based on the appearance frequency, the warehouse-out information comprises: a commodity batch number and a commodity warehouse-out quantity, and the appearance frequency of both the shelved commodities and the associated shelved commodities appearing in the same bills is greater than a preset frequency threshold;

query commodity attributes stored in a commodity system, and determine placement information of the shelved commodities on shelves based on the commodity attributes, the warehouse-out information, the association relation, and shelf information of the shelved commodities, wherein the commodity attributes comprise commodity type, commodity specification, and commodity sales price, the placement information comprises shelf type, shelf layer number and specification, and shelf storage location number, and the determining the placement information of the shelved commodities on the shelves comprises:

determining a proximity relation between placement positions of the shelved commodities and the associated shelved commodities according to a preset associated placement rule and the commodity type, the preset associated placement rule including an order of the appearance frequency from high to low, determining a shelf type for placing the shelved commodities according to the commodity specification, the shelf type including a multilayer shelf and a container shelf and allocating shelf storage locations for the shelved commodities based on the commodity warehouse-out quantity and the commodity specification;

issue an adjusting instruction to a shelf adjusting device according to a determined shelf layout so as to control a shelf management system to adjust a shelf layout according to the placement information, and control a commodity conveying system to place the shelved commodities to shelf positions corresponding to the placement information;

determine a current remaining commodity quantity of the shelved commodities based on detection signals collected by detection devices disposed correspondingly to shelf storage locations, and determine a replenishment quantity and replenishment positions of the shelved commodities according to the current remaining commodity quantity of the shelved commodities; and issue a replenishment instruction to a commodity conveying system so as to control the commodity conveying system to place replenished commodities corresponding to the replenishment quantity to the replenishment positions.

10. A non-transitory computer-readable storage medium having stored thereon computer program instructions which, when executed by one or more processors, cause the one or more processors to:

query historical sales information of commodities recorded in a sales system, and determine warehouse-out information of shelved commodities and an association relation between the shelved commodities according to the historical sales information of the commodities, wherein the determining the warehouse-out information of the shelved commodities and the association relation between the shelved commodities according to the historical sales information of the commodities comprises:

counting a historical sales quantity of the shelved commodities according to historical bills of the commodities, determining an estimated warehouse-out quantity of the shelved commodities based on the historical sales quantity, determining the warehouse-out information according to the estimated warehouse-out quantity and commodity inventory information, counting an appearance frequency of various commodities appearing in same bills according to the historical bills of the commodities, and obtaining associated shelved commodities corresponding to the shelved commodities based on the appearance frequency, the warehouse-out information comprises: a commodity batch number and a commodity warehouse-out quantity, and the appearance frequency of both the shelved commodities and the associated shelved commodities appearing in the same bills is greater than a preset frequency threshold;

query commodity attributes stored in a commodity system, and determine placement information of the shelved commodities on shelves based on the commodity attributes, the warehouse-out information, the association relation, and shelf information of the shelved commodities, wherein the commodity attributes comprise commodity type, commodity specification, and commodity sales price, the placement information comprises shelf type, shelf layer number and specification, and shelf storage location number, and the determining the placement information of the shelved commodities on the shelves comprises:
- determining a proximity relation between placement positions of the shelved commodities and the associated shelved commodities according to a preset associated placement rule and the commodity type, the preset associated placement rule including an order of the appearance frequency from high to low,
- determining a shelf type for placing the shelved commodities according to the commodity specification, the shelf type including a multilayer shelf and a container shelf and
- allocating shelf storage locations for the shelved commodities based on the commodity warehouse-out quantity and the commodity specification;

issue an adjusting instruction to a shelf adjusting device according to a determined shelf layout so as to control a shelf management system to adjust a shelf layout according to the placement information, and control a commodity conveying system to place the shelved commodities to shelf positions corresponding to the placement information;

determine a current remaining commodity quantity of the shelved commodities based on detection signals collected by detection devices disposed correspondingly to shelf storage locations, and determine a replenishment quantity and replenishment positions of the shelved commodities according to the current remaining commodity quantity of the shelved commodities; and issue a replenishment instruction to a commodity conveying system so as to control the commodity conveying system to place replenished commodities corresponding to the replenishment quantity to the replenishment positions.

11. The commodity replenishment device according to claim 9, wherein the allocating the shelf storage locations for the shelved commodities based on the commodity warehouse-out quantity and the commodity specification comprises:
- determining the shelf layer number and specification and the shelf storage location numbers corresponding to the shelved commodities according to length, height, and width information of the shelved commodities and the commodity warehouse-out quantity; or
- determining a required shelf container volume according to a unit volume of the shelved commodities and the commodity warehouse-out quantity, and allocating shelf containers to the shelved commodities based on the shelf container volume and determining shelf storage location numbers.

12. The commodity replenishment device according to claim 11, wherein the memory further stores program instructions which, when executed by the processor, cause the processor to:
- set a correspondence relation between the shelf storage location numbers and the shelved commodities; and
- display commodity attribute information of the shelved commodities corresponding to the shelf storage locations in a display device based on the correspondence relation.

13. The commodity replenishment device according to claim 12, wherein the determining the replenishment quantity and the replenishment positions of the shelved commodities according to the current remaining commodity quantity of the shelved commodities comprises:
- if it is determined that a ratio of the current remaining commodity quantity of the shelved commodities to the commodity warehouse-out quantity of the shelved commodities is less than or equal to a preset remaining commodity ratio threshold, determining the replenishment quantity of the shelved commodities to perform replenishment processing.

14. The commodity replenishment device according to claim 13, wherein the determining the replenishment quantity of the shelved commodities comprises:
- obtaining an estimated replenishment quantity corresponding to the shelved commodities based on a difference between the commodity warehouse-out quantity and the current remaining commodity quantity of the shelved commodities;
- determining a commodity sales quantity corresponding to the shelved commodities through bill information of the shelved commodities during a period between a commodity outbound and a first replenishment or between two continuous replenishments;
- obtaining a quantity of picked but not purchased commodities corresponding to the shelved commodities based on a difference between the estimated replenishment quantity and the commodity sales quantity; and
- determining the replenishment quantity based on the commodity sales quantity and the quantity of the picked but not purchased commodities.

* * * * *